(12) United States Patent
Weaber et al.

(10) Patent No.: US 6,860,071 B2
(45) Date of Patent: Mar. 1, 2005

(54) REINFORCED STAIR TREAD AND METHODS FOR MAKING SAME

(75) Inventors: Matthew G. Weaber, Annville, PA (US); Galen G. Weaber, Lebanon, PA (US); Jeffrey Winslow, Lebanon, PA (US)

(73) Assignee: Weaber, Inc., Lebanon, PA (US)

( * ) Notice: Subject to any disclaimer, the term of this patent is extended or adjusted under 35 U.S.C. 154(b) by 0 days.

(21) Appl. No.: 10/112,733

(22) Filed: Apr. 2, 2002

(65) Prior Publication Data

US 2003/0182880 A1 Oct. 2, 2003

Related U.S. Application Data

(63) Continuation of application No. 08/364,251, filed on Dec. 27, 1994, now abandoned.

(51) Int. Cl.$^7$ .............................................. E04F 11/16
(52) U.S. Cl. ......................... 52/179; 52/726.1; 428/55; 428/58; 428/172; 428/179
(58) Field of Search ....................... 52/179, 182, 403.1, 52/480, 385; 408/364; 428/54–56, 58, 106, 172

(56) References Cited

U.S. PATENT DOCUMENTS

| | | | |
|---|---|---|---|
| 1,778,333 A | | 10/1930 | Neumann |
| 3,204,300 A | * | 9/1965 | Hofmann ..................... 403/265 |
| 3,355,196 A | * | 11/1967 | Harrison ..................... 403/265 |
| 3,480,054 A | * | 11/1969 | Marian ......................... 144/347 |
| 3,554,850 A | * | 1/1971 | Kuble ........................... 52/392 |
| 3,692,340 A | * | 9/1972 | Roth ............................. 403/364 |
| 4,730,425 A | | 3/1988 | Young |
| 5,088,247 A | | 2/1992 | Young |
| 5,313,758 A | * | 5/1994 | Willman et al. ............... 52/415 |
| 5,386,673 A | | 2/1995 | Bellegarde |
| 5,531,048 A | | 7/1996 | Darling |
| 5,888,620 A | * | 3/1999 | Grenier ........................ 428/172 |
| 5,930,967 A | * | 8/1999 | Stoehr et al. ............... 52/403.1 |
| 5,968,625 A | * | 10/1999 | Hudson ........................ 428/54 |
| 5,985,398 A | | 11/1999 | Bellegarde |
| 5,985,415 A | * | 11/1999 | Giltner ........................ 428/192 |
| 6,023,900 A | * | 2/2000 | Stoehr et al. ............... 52/403.1 |
| 6,025,053 A | * | 2/2000 | Grenier ........................ 428/172 |
| 6,067,758 A | | 5/2000 | Zenkner |
| 6,082,061 A | | 7/2000 | Ryan |
| 6,115,975 A | | 9/2000 | Abdollahi |
| 6,173,540 B1 | | 1/2001 | Spivey |
| 6,231,950 B1 | * | 5/2001 | Giltner ........................ 428/192 |
| 6,378,579 B1 | * | 4/2002 | Giltner ........................ 144/347 |
| 6,446,412 B2 | * | 9/2002 | Mathis ........................ 52/730.7 |
| 6,450,235 B1 | * | 9/2002 | Lee .............................. 160/236 |
| 6,596,362 B1 | * | 7/2003 | Chung .......................... 428/55 |
| 2002/0076275 A1 | * | 6/2002 | Hernandez et al. .......... 403/364 |
| 2002/0117272 A1 | * | 8/2002 | Lee .............................. 160/236 |
| 2002/0182361 A1 | * | 12/2002 | Hayakawa .................... 428/60 |

FOREIGN PATENT DOCUMENTS

CA  2138867  6/1996

* cited by examiner

Primary Examiner—Carl D. Friedman
Assistant Examiner—Yvonne M. Horton
(74) Attorney, Agent, or Firm—Winston & Strawn LLP (57) ABSTRACT

A stair tread having predetermined dimensions including a top and bottom that are at least substantially parallel and substantially planar that includes a nose strip extending the length of the stair tread, having a hardwood appearance at the top, and having an edge at the front that is shaped in cross-section from the top to the bottom to provide a nose to the stair tread, a base including a plurality of base strips having a first joint between each adjacent base strip, wherein the base extends the length of the tread and, together with the nose strip, extends from the front to the rear of the tread, and a separately formed cover strip disposed over the base and sized sufficiently to provide the appearance of hardwood on the top.

32 Claims, 6 Drawing Sheets

REINFORCED STAIR TREAD AND METHODS FOR MAKING SAME

CROSS-REFERENCE TO RELATED APPLICATION

This application is a continuation of application Ser. No. 08/364,251, filed Dec. 21, 1994, entitled "Stairtread Made of a Combination of Higher Quality Wood and Lower Quality Material" abandoned.

FIELD OF INVENTION

The present invention relates to a stair tread having a visible hardwood appearance, a nose strip having a shaped front edge in cross-section, a plurality of base strips, and a separately formed cover strip that extends over the rear base strips. Methods of forming such stair treads are also included.

BACKGROUND ART

Stair treads are the weight-bearing portion the make up the generally horizontally planar portion of each step on a flight of stairs. Various stair tread structures have been tried, including the following:

U.S. Pat. No. 1,778,333 discloses the manufacture of rough lumber into finished lumber with less waste for flooring, siding, and other finished lumber. This is accomplished by cutting out defects and by splitting the boards along their length to use rough lumber to provide double the quantity of finished lumber having clear wearing surfaces. Pieces of such lumber can be joined end-to-end, as the reference states that glued joints can be made as strong as required.

U.S. Pat. No. 4,730,425 discloses a returned stair tread for use on an open portion of a stairway having a return nosing joined on at least one side edge to form an exposed shaped or mitered joint to join the tread and the nosing. A nail, wood screw, or other fastener, or a wood adhesive, can be used to prevent sliding of the nosing and tread relative to each other. U.S. Pat. No. 5,088,247 discloses a returned stair tread of wood and a return nosing joined on a side edge. The nosing and tread are slidable relative to one another and are joined on a rear end portion with an expansion joint.

U.S. Pat. No. 5,386,673 discloses a returned stair tread having a return nose fitting flush against its side edge and being slidably interconnected by tongue and groove construction. The tread also includes a non-rigid securing means to join the nose and tread along their length while permitting each to expand and contract over a range of temperatures and humidities.

U.S. Pat. No. 5,531,048 discloses a method for manufacturing a stairway made from wood-composite materials to a stairway that appears to be solid wood by using sheets of veneer overlay scribed and trimmed at least the end portions of each tread, riser, or both and leaving the central portion uncovered.

U.S. Pat. No. 5,985,398 discloses a stair tread having the appearance and structural stability of solid hardwood treads but includes a core layer made of lamellas of lower quality wood glued laterally adjacent each other and on the top surface of which is glued lamellas made of higher quality wood that are laterally glued adjacent each other. The outer wooden member most remote from the nose is formed of a core lamella that must be unbroken in a single solid piece of lower quality wood, while the surface lamella is a single solid piece of higher quality wood.

U.S. Pat. No. 6,067,758 discloses a stair construction element including a horizontal tread part and a nosing-like riser extending vertically therefrom, where the tread and nosing-like riser form an integral element encased or coated with laminate.

U.S. Pat. No. 6,082,061 discloses a stair tread including a rigid frame encapsulated with a structural plastic material. The rigid frame can be made of steel and the plastic of polyol and isocyanate blend (i.e., a polyurethane) applied by reaction injection molding.

U.S. Pat. No. 6,115,975 discloses a stair system having an improved stair nose molding and back molding to provide a free-floating riser and free-floating tread, where the stair nose molding has a cutout with tongue to receive the grooved stair tread and a stair back molding having a groove to receive the bottom edge of the riser in sliding arrangement.

U.S. Pat. No. 6,173,540 discloses a stair tread fabricated from engineered wood product such as strand board made of wood strips, with each surface layer oriented perpendicularly to the core layers and bonded with phenolic resin or binding agents and subjected to intense heat and pressure to irreversibly bond the surface and core layers and achieve suitable stair tread strength and performance criteria. The tread is made from one inch thick structural panels using standard tools, and has a rounded, forward edge and a riser groove along its entire length.

Despite these patents, there still exists a need for more cost efficient stair treads having suitable appearance and sufficient structural integrity for use in conventional stair tread applications. The present invention satisfies this need.

SUMMARY OF THE INVENTION

The invention relates to a stair tread having a predetermined length, a front, a rear, a top and a bottom, wherein the top and the bottom are at least substantially planar and substantially parallel to each other, including a nose strip extending the length of the stair tread, having a hardwood appearance at the top, and having an edge at the front that is shaped in cross-section from the top to the bottom to provide a nose to the stair tread, a base including a plurality of base strips having a first joint between each adjacent base strip, wherein the base extends the length of the tread and, together with the nose strip, extends from the front to the rear of the tread, and a separately formed cover strip disposed over the base and sized sufficiently to provide the appearance of hardwood on the top.

The nose strip can include a plurality of portions that extend the length of the tread and are permanently joined by an adhesive component. Preferably, the plurality of portions includes at least three portions oriented horizontally and stacked vertically over each other to extend from the top to the bottom of the tread. In another embodiment, at least one of the portions includes a plurality of pieces arranged end-to-end.

The cover strip can include a plurality of laterally adhered portions having a second joint between each adjacent portion. In one embodiment, the plurality of portions are oriented from the front to the rear of the tread, while in another they are oriented along the length of the tread. Preferably, although the joints may touch, the first and second joints do not line up along their length because they are staggered or perpendicular to each other.

It is also possible to have at least one of the base strips include a plurality of portions oriented horizontally and adhered to each other in a stacked, vertical arrangement.

Preferably, the separately formed cover strip extends over the nose strip. In another preferred embodiment, at least one of the base strips includes a plurality of base pieces, wherein adjacent base pieces are permanently attached end-to-end using 3 to 15 finger joints and an adhesive component.

The invention relates to a stair tread having a predetermined length, a front, a rear, a top and a bottom. Advantageously, the top and the bottom are at least substantially planar and substantially parallel to each other. The stair tread includes a nose strip extending the length of the stair tread, having a hardwood appearance at the top, and having an edge at the front that is shaped in cross-section from the top to the bottom to provide a nose to the stair tread. The tread also includes a rear base strip at the rear of the stair tread that includes a plurality of rear pieces, wherein an adhesive component is disposed over a sufficient surface area between each pair of adjacent rear pieces so as to permanently attach each pair of adjacent rear pieces end-to-end, and a cover strip that covers the rear base strip sufficiently to provide the appearance of hardwood on the top. In a preferred embodiment, the sufficient surface area is provided by 3 to 15 finger joints between each pair of adjacent rear pieces. In another embodiment, a adjacent rear pieces are permanently attached end-to-end using 3 to 8 finger joints and an adhesive component.

In one embodiment, the nose strip is made of a single, unbroken hardwood member that extends from the top to the bottom of the stair tread. In another embodiment, the stair tread further includes a central base portion between the rear base strip and the nose strip that extends the length of the tread, wherein the cover strip fully extends over the length of the tread and also covers the central base portion.

In a preferred embodiment, about 4 to 6 finger joints are present between adjacent rear pieces, and the finger joints are trapezoidally shaped. In yet another preferred embodiment, at least two and more preferably all of the finger joints are about ⅛ to ⅝ inches long.

The central base portion can include multiple base strips extending the length of the tread. If desired, each central base strip can have a separate cover strip portion of the cover strip disposed thereon. In another embodiment, the cover strip includes a plurality of cover strip portions that each extend the length of the tread and have a first joint therebetween, and the central base portion is attached laterally to the rear base strip to form a second joint. Preferably, the first and second joints are disposed so as not to lie adjacent to each other. In yet another embodiment, the cover strip includes a plurality of cover strip portions that extend the length of the tread and comprise hardwood.

In one embodiment, the adhesive component can be at least one glue, hot melt, or a combination thereof. The nose strip and cover strip can preferably but optionally include the same hardwood. It is preferred for the rear base strip to include 2 to 12 rear pieces, preferably 4 to 8. Also, the finger joints in the rear base strip are preferably disposed vertically relative to each other, although they can be disposed horizontally to each other if desired and sufficient strength is provided.

The invention also relates to a method of forming a stair tread having a predetermined length by providing a plurality of first pieces having ends with sufficient surface area therebetween to facilitate permanent bonding of the first pieces, permanently joining the adjacent first pieces end-to-end to form a rear portion of the stair tread having the predetermined length, attaching a cover portion over a sufficient amount of the rear portion to provide a visible appearance of hardwood to the stair tread, and laterally attaching a nose strip including hardwood to the combined rear portion and cover portion so as to form a stair tread having the appearance of hardwood. In a preferred embodiment, the sufficient surface area is provided by a 3 to 15 finger joints between the ends of each pair of adjacent first pieces.

Preferably, the stair tread is formed by including a central base portion between the rear and nose portions before covering the rear and central portions with the cover portion. This central base portion is preferably formed by attaching one or more second pieces that extend the length of the tread. In one preferred embodiment, the attaching of the rear portion and the central base portion includes planing abutting edges of the rear and central base portions to make them at least substantially planar, and then laterally adhering the substantially planar edges together with an adhesive component before attaching the cover portion. The cover portion is preferably configured and dimensioned to fully cover both the rear and central portions.

In another preferred embodiment, the attaching of the cover portion includes adhering adjacent hardwood veneer pieces extending the length of the tread to form the cover portion, and then permanently adhering the cover and rear portions together. In another embodiment, the cover portion includes one or more pieces of hardwood veneer fully extending over the length of the stair tread. In yet another embodiment, laterally attaching the nose strip includes planing abutting edges of the central base portion and nose strip into substantially planar surfaces and then adhering the substantially planar surfaces together. The nose strip can be molded to form a desired shape on the visible portion of the stair tread, such as a nose that is rounded in cross-section from the top to the bottom of the stair tread. Other nose shapes include those that are rounded only at the top or bottom edge of the tread, or both, as well as specifically oval or circular shapes.

The invention also relates to a stair tread having a predetermined length, a front, a rear, a top and a bottom, wherein the top and the bottom are at least substantially planar and substantially parallel to each other, including a nose strip extending the length of the stair tread, having a hardwood appearance at the top, and having an edge at the front that is rounded in cross-section from the top to the bottom to provide a nose to the stair tread, a plurality of rear pieces that form a rear base strip at the rear of the stair tread, wherein adjacent rear pieces are permanently attached end-to-end using at least one finger joint and an adhesive component therebetween, and a cover strip that covers the rear base strip sufficiently to provide the appearance of hardwood on the top, wherein the at least one finger joint is a jigsaw puzzle-shaped finger or a hole and insert-type arrangement.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

It has now been advantageously found that stair treads having suitable appearance and sufficient structural integrity, which meets or exceeds applicable building codes and other regulations, can be formed more cost effectively. In one embodiment, the stair tread has a nose strip (preferably with a rounded front edge in cross section) and a hardwood appearance, a base including a plurality of strips, and a separately formed cover strip disposed over at least the base to provide the appearance of hardwood on the top of the tread. In an optional but preferred embodiment, the base includes a rear base strip and a central base portion between the rear base strip and the nose strip. In a preferred embodiment, the stair tread is made of hardwood or materials having the same, or substantially the same, appearance as hardwood, at least in portions of the stair tread that are visible once installed on a staircase, i.e., the nose strip and the cover strip portion. The stair tread is optionally but preferably made of other woods (optionally including low grade hardwoods), wood-containing products, or other materials that provide sufficient structural properties as hardwood stair treads in portions that are not visible once the tread is installed on a stairway.

The inclusion of a separately formed cover portion that extends across the base portion, or central base portion and rear base strip, can advantageously provide the stair tread a structure that has the appearance of hardwood and at least the same strength as a solid hardwood stair tread while adding value to lower valued products. This is achieved by simpler, more elegant processing techniques that permit smaller pieces of hardwood, other wood, or wood-like materials to be assembled into a suitable structure. It has also been surprisingly and unexpectedly discovered that sufficient structural strength can be obtained by joining a plurality of pieces of materials, preferably hardwood, wood, wood-containing pieces such as offall wood, or other materials, using finger joints and an adhesive component to form the rear base strip of the stair tread when the plurality of pieces are permanently joined in end-to-end fashion. The adhesive component used in any embodiments herein can include one or more glue materials (such as wood glue commercially available from Borden Chemical of High Point, N.C.), any suitable hot melt, 1- or 2-part epoxies, or the like, or combinations thereof. The base portion (which in one embodiment includes the rear base strip and optional central base portion) typically uses low grade hardwoods, non-hardwoods, wood-containing materials, or the like, or combinations thereof. This can increase the value of such stair treads while providing similar or even increased strength to the overall tread compared to a tread without such finger joints and adhesive component.

The adhesive component can be used to join pieces of the rear base strip, central base strip(s), or any combination thereof, so as to form a full strip that extends the length of the tread. In one preferred embodiment, the pieces are joined end-to-end and have adhesive component disposed over a sufficient surface area between each pair of adjacent pieces so as to permanently adhere the adjacent pieces to each other. In one preferred embodiment, "sufficient surface area" means that adhesive component can permanently join the pieces to form a strip that is at least as strong as an unbroken strip of wood. Typically, when each strip is formed of a plurality of pieces, it can contain from 2 to 12 pieces, preferably 4 to 8 pieces. In one preferred embodiment, a strip can contain from 5 to 7 pieces of material, such as wood.

In a preferred embodiment, sufficient surface area can be obtained by including from 3 to 15 fingers, preferably from 3 to 8 fingers, in the joint between each pair of adjacent, end-to-end pieces in the rear base strip or any other central base strip. In a preferred embodiment, from 4 to 6 fingers can be included. Preferably, at least two fingers in each joint are about ⅛ to ⅝ inch, and more preferably each of the fingers in a joint have that finger length. More preferably, the finger length is about ¼ to ½ inch. An exemplary finger length is about ⅜ inch. The fingers must have sufficient surface area to provide the required strength when weight is applied to the top of the tread, and are preferably not overly long to minimize or avoid loss of wood shaved out of the fingers during processing that can increase the cost of the stair treads with minimal or no additional benefit to the strength of the stair tread.

Any suitable finger shape available to those of ordinary skill in the art can be used so long as the finger joint will provide sufficient strength in a vertical direction, e.g., when weight is applied from the top of the tread. The finger joints can be oriented vertically or horizontally, although in one preferred embodiment they are arranged in stacked horizontal fashion to provide additional strength when subjected to vertical forces from the top of the tread. Particularly suitable finger shapes include rectangular/square, triangular, jigsaw puzzle, trapezoidal, a hole and insert arrangement where the insert forms a bridge between the two pieces, mountaintop, or a combination thereof. When a hole and insert shape or jigsaw puzzle shape are used, only a single "finger" is required although more can be included. The mountaintop shape, when used, can be triangular or another similar shape to a mountain, but has adjacent finger peaks of differing height and preferably all peaks in a joint are of differing height. A preferred finger shape is trapezoidal fingers. Preferably, trapezoidal fingers are at least about 1.1 times thicker, more preferably at least about 1.3 times thicker, at the base of each finger compared to the tip thickness. By trapezoidal, it should be understood that the tip of the finger furthest from the piece it is attached to is at least substantially parallel to the edge of that piece that forms the base of the trapezoid. The trapezoidal finger tips can be rounded if desired, but in one embodiment the tips are not rounded. Certain finger shapes, such as a squared off finger, can be used but typically require longer lengths of about ¾ to 1¼ inches, and are not as desirable as trapezoidally shaped fingers. Any of these suitable types of finger joints can be used for combining pieces of material in the central base portion, cover strip, and even the nose strip, or any combination, as described herein, preferably for joining such pieces of material in end-to-end fashion. Different shapes and sizes of finger joints can be used in the same joint between an adjacent pair of rear pieces or between different joints, or both, if desired. Preferably, the finger joints between each adjacent pair of rear pieces are the same size and shape. The finger joints can be oriented in a horizontal or vertical fashion, so long as they provide a stair tread of sufficient strength in the vertical direction when force is applied to the top of the tread.

Without being bound by theory, it is believed that the adhered finger joints are stronger than an unbroken piece of virgin wood, i.e., the plurality of rear pieces that are permanently attached end-to-end with finger joints are stronger than a rear base strip formed of a single, unbroken wood piece when placed under an equivalent, vertically compressive force.

The nose strip and cover strip can each independently be selected from a hardwood or a material having the appearance and structural strength of hardwood. Preferably, the nose and the cover strip are each independently formed of hardwood. In one embodiment, the nose and cover strip are both formed of the hardwood, preferably the same hardwood, although in another embodiment the hardwood may be different, e.g., to provide an interesting visual effect if desired. One or both ends of each tread can be covered with a veneer of hardwood if desired, such as when one side of a stairway is designed to be open to a multi-story foyer. Such open end can also be finished the same as the nose strip to provide a more uniform appearance if desired, which includes providing the same shaped portion in cross-section. The end(s) of a tread, the nose, or any portion can be colored wood or stained wood if desired.

The nose strip can be formed of a plurality of pieces, but preferably it is a single, unbroken piece of material that preferably extends from the top to the bottom of the tread. When the nose strip includes a plurality of pieces, they can be affixed in any manner but are preferably permanently joined with an adhesive component. These pieces typically extend the length of the tread, but in one embodiment they can include pieces arranged end-to-end. These end-to-end nose pieces can be simply placed adjacent one another and laterally glued to the central base portion or the base, or they can have finger joints, and adhesive component therebetween, or both. Preferably, finger joints, adhesive component, or both would be used in the event a plurality of nose pieces are included. Also, the nose strip can include a plurality of thin pieces that are stacked to build the full nose strip. These pieces can extend the full length of the tread, if desired, and preferably there will be at least two, more preferably at least three oriented horizontally or vertically and arranged to extend from the top to bottom of the tread and from the front to the base or central base portion. These multiple pieces are preferably permanently joined with an adhesive component. Preferably, such thin pieces will be horizontally oriented in the tread so that, once the nose is rounded in cross section, the pieces are stacked vertically in the tread and appear substantially or completely like natural wood grain. In this embodiment, the pieces are said to be "face glued" when an adhesive component is included therebetween. In another embodiment, when the pieces are vertically oriented and stacked laterally adjacent to each other, the adhesive component can preferably be used to "edge glue" the pieces together in permanent fashion.

Any outer edge of the tread, preferably the nose, can be shaped in cross-section to a desired shape. Preferred shapes include those that are rounded, including rounded from top to bottom in cross-section and those having a rounded edge at the top, the bottom, or both. One exemplary shape is rounded top to bottom with a ⅛ inch radius.

In one embodiment, the cover strip can include one single, unbroken sheet of material having a hardwood appearance that extends over the optional central base portion and the rear base strip.

The cover strip can itself be formed of a plurality of portions and, if desired, any number of these can be hardwood of the same or different kinds. Preferably, from two to six portions can be used. If more than one portion is used, each cover strip portion can typically be from about 1 to 10 inches in width. For example, the cover strip can include three portions, and the middle of the three can be a different material compared to the two portions on the edges of the cover strip. Moreover, the nose can be the same hardwood as the middle portion, such that an alternating appearance can be obtained. The nose strip and cover strip together form the visible portion of the stair tread, once assembled and installed, and thus it is preferred to affix any portions thereof using a non-visible or barely visible device or adhesive component. Preferably, this affixing will be accomplished with an adhesive component of the type described herein. While the cover strip preferably extends fully over the entire length of the rear strip and central base portion, certain stair treads may include a small margin at its ends that are not covered to facilitate insertion into stair risers or other components to enhance the ornamental appearance of the stair. In one preferred embodiment, the cover strip extends over the base portion and the nose strip. This can beneficially provide a more uniform top to the stair tread. In another embodiment, a second cover strip having at least the appearance of hardwood of the same or different materials and construction as the first cover strip can be applied to the base portion, or central base portion and rear base strip, on the "bottom" of the tread opposite the first cover strip on the "top." Such a construction can advantageously permit the treads of the invention to be reversible, such that they can be flipped after they become worn or even flipped during installation depending on which side of the stairway might be opened and which side against a wall.

Various other designs are envisioned for the cover strip, as well. If desired, each cover strip portion can be formed of smaller pieces joined end-to-end to form a full length portion that extends the length of the tread, although care should be taken to avoid or prevent the visible appearance of these joints. The cover strip portions can then be disposed in patterns, such as a checkerboard or a staggered herringbone-type pattern. Also, the cover strip can include portions that are oriented between the front and rear of the tread rather than along the length of the tread. This can provide joints between such portions that are perpendicular to the joints of any strips of material used beneath the cover strip, such as in the central base portion or rear base strip.

When the central base portion is optionally, but preferably, included, 1 to 12 strips can be used. For example, 12 one inch strips can be laterally combined to form the central base portion. These strips, like the rear base portion, can each be formed of smaller pieces of material joined together end-to-end, except that no finger jointing or adhesive component is necessarily required. Typically, from 1 to 12 smaller pieces can be used end-to-end for each strip. It should be understood that finger jointing, an adhesive component, or other method of affixing the pieces end-toend, or a combination thereof, can be used if desired, since these strips will not typically be visible in the installed stair tread. Preferably, an adhesive component is used to join these smaller pieces end-to-end to form each strip. Each full or joined piece strip should extend the length of the stair tread once the strip is ready to be joined to any adjacent part of the stair tread, i.e., the nose strip, rear base strip, additional strips in the central base portion, or cover strip. These strips in the central base portion are typically placed laterally adjacent and affixed, such as with an adhesive component, nail(s), screw(s), or the like, or a combination thereof. The adhesive component can be the same or different from that described herein for the other parts of the tread. In another embodiment, the strips can be oriented from the front to the rear of the tread so that they extend from the nose strip to the rear base strip. This provides staggered joints relative to any cover strip portions disposed above that are oriented along the length of the tread. Regardless of the orientation thereof, each strip in the central base portion of the tread, i.e., between the nose strip and rear base strip, can be from about 0.5 to 12 inches in width, preferably from about 0.75 to 8 inches in width. In one preferred embodiment, the wood strips can be from about 2 to 5 inches in width. When multiple strips are used in the central portion, each can have a different width or the same width, although it is desired to use the same width. When multiple pieces are used, the length of pieces used end-to-end to form each strip in the central base portion (or even the rear base strip, or both) can be from about 3 to 36 inches long. It should be understood that for the embodiment including a base under the cover strip, the base can use the same materials, methods, and structures as those set forth herein for the rear base strip, the central base portion, or both.

In another embodiment, the base or the optional central base portion can include at least one strip having a plurality of portions. These portions can, for example, be thin layers of material that are oriented horizontally and stacked vertically on top of each other to form a full size strip from the bottom of the tread up to where the cover strip is applied. These portions can, but do not have to, extend the length of the base or central base portion. If not, pieces can be affixed end-to-end to form a full length portion. It is also possible to include a strip having pieces of wood at each end of the tread that extend from the bottom up to the cover strip and in between can be disposed a plurality of portions such as thin layers. In all these embodiments, the portions or layers are preferably affixed to each other, more preferably by including an adhesive component to permanently join the portions. Various combinations of structure can be envisioned by those of ordinary skill in the art to design the base, or the central base portion and rear base strip. There are typically no limitations to such structures in terms appearance since this part of the tread is typically not visible once installed on a stairway, such that the part must merely have strength to withstand expected loads.

Any suitable material may be used for the central base portion, preferably one containing wood or wood-like material(s). Although not required, these strips in the central base portion preferably are formed of the same material or compatible materials so that they will remain sufficiently joined during installation and use. For example, a single piece of medium density fiberboard ("MDF"), pressboard, lower value wood (i.e., woods less expensive than hardwood), or even low grades of hardwood can be used to form the central base portion, or to form strips in the central base portion. Examples of lower value wood include poplar, pine, fir, and the like. In one embodiment, the central base portion and rear base strip are formed of the same material.

In one embodiment, the strips of wood used for the central base portion and cover strip each have a planar or substantially planar edge to facilitate using adhesive to laterally join the strips to each other and to the nose. Thus, it is preferred in this embodiment that tongue and grooves are not used to adhere the central base portion and cover strip together edgewise with the nose strip.

To the extent not already described, it is also possible in various embodiments herein to include in one or more of the nose strip, cover strip, or base (or optional central base portion or rear base strip) a plurality of portions that are horizontally oriented and vertically stacked so as to form a sandwich-type structure. This structure is preferably affixed with an adhesive component, although in the base other methods of affixing the portions can be more readily used as noted herein. These portions can extend the length of the tread, but preferably they are formed of pieces of the materials described herein (i.e., hardwood, low grade hardwood, other wood, wood-containing material, etc.) that are disposed end-to-end. Preferably, adjacent end-to-end pieces in each portion are affixed to each other, more preferably with an adhesive component, although the pieces can simply be affixed to other adjacent portions that are above or below (i.e., toward the top or bottom of the tread). This permits various interesting structures to be provided, particularly in the base. For example, a strip in the base, central base portion, or rear base strip can include a bottom-most portion having a plurality of pieces each having the same first length (e.g., from about 1 to 20 inches long), a portion disposed over the bottom-most portion having a plurality of pieces all of a second length, and a topmost portion disposed thereover having a plurality of pieces all of the first length or all of a third, different length. The lengths can always be different between layers, or within a layer. Any number of portions can be used, depending on thickness, to provide the strip from the bottom of the tread to where the cover strip is affixed. These pieces should have their lengths selected so that the joints between adjacent pieces do not line up, but instead are staggered. The resulting structure is a layered strip with staggered joints, and can be arranged like a brick wall with alternating layers having joints offset from those of the intermediate layer. This embodiment can provide sufficient strength in a strip, such as the rear base strip, without the need to use finger joints.

The stair treads herein can be prepared according to the method disclosed in U.S. Pat. No. 5,985,398, the disclosure of which is hereby expressly incorporated herein by reference thereto. In particular, cover portions of the present invention can be placed on base portions or central base strips (and the rear base strip), which are then planed and edge glued to adjacent pre-glued cover/base structures. This method can be used to provide the structures herein, especially for those embodiments that include finger jointing in one or more parts of the tread and those where the nose strip comprises a plurality of portions, pieces, or both.

Preferably, however, the stair tread of the present invention is prepared according to the following process, although any suitable modifications of this method of preparation may be used to provide the stair tread described herein. In one embodiment, the pieces of material in the rear strip are permanently finger jointed and adhered together to form a full length rear base strip, which is then planed. The optional but preferable central base portion is then attached to the rear base strip. If multiple strips are desired in the central base portion, they can be planed if necessary and adhered to each other before or after the rear base strip is adhered to an edge of the central base portion. Preferably, the optional central base portion and rear base strip are preferably laterally affixed to each other before the cover strip is joined thereto. Thus, concurrently or sequentially, and preferably concurrently with preparation of the base layer of optional central base portion and rear base strip, the cover strip is prepared of one or more portions, each of which for example can extend the full length of the tread. If more than one portion is present in the cover strip, each adjacent pair of portions are laterally affixed, such as with an adhesive component to form a cover strip that will extend across a sufficient portion of the optional central base portion and the rear base strip to provide the visible appearance of hardwood across the entire top of the tread. Preferably, the pre-formed base layer of optional central base portion and rear base strip and the preformed cover strip are then adhered face-to-face to each other to form a tread body.

In another embodiment, the base strips of material in the base are affixed to each other, optionally being planed if necessary to facilitate formation of the base. Concurrently or sequentially, and preferably concurrently with preparation of the base, the cover strip is separately prepared of one or more portions, for example, each of which can extend the full length of the tread. If more than one portion is present in the cover strip, each adjacent pair of portions are laterally affixed, such as with an adhesive component, to form a cover strip that will extend across a sufficient portion of the base to provide the visible appearance of hardwood across the entire top of the tread. Preferably, the pre-formed base layer and the pre-formed cover strip are then adhered face-to-face to each other to form a tread body.

The methods of the invention permit strips, portions, or pieces of material to be oriented or disposed in ways that permit the joints of the cover strip and the joints of the base to not line up with each other, such as by being staggered, perpendicular, or the like. In each method, at least the edge of the tread body adjacent the front of the tread is planed and the nose strip is planed if needed and affixed thereto. If not premolded, the nose can then be molded onto the nose strip to form a desired cross-section, such as rounded. Optionally, the entire tread can then be planar sanded sufficiently to meet building codes or customer preferences. Any desired finishing, such as sanding, staining, coloring, sealing, and the like, can be accomplished at any step of the assembly.

Figure 1:
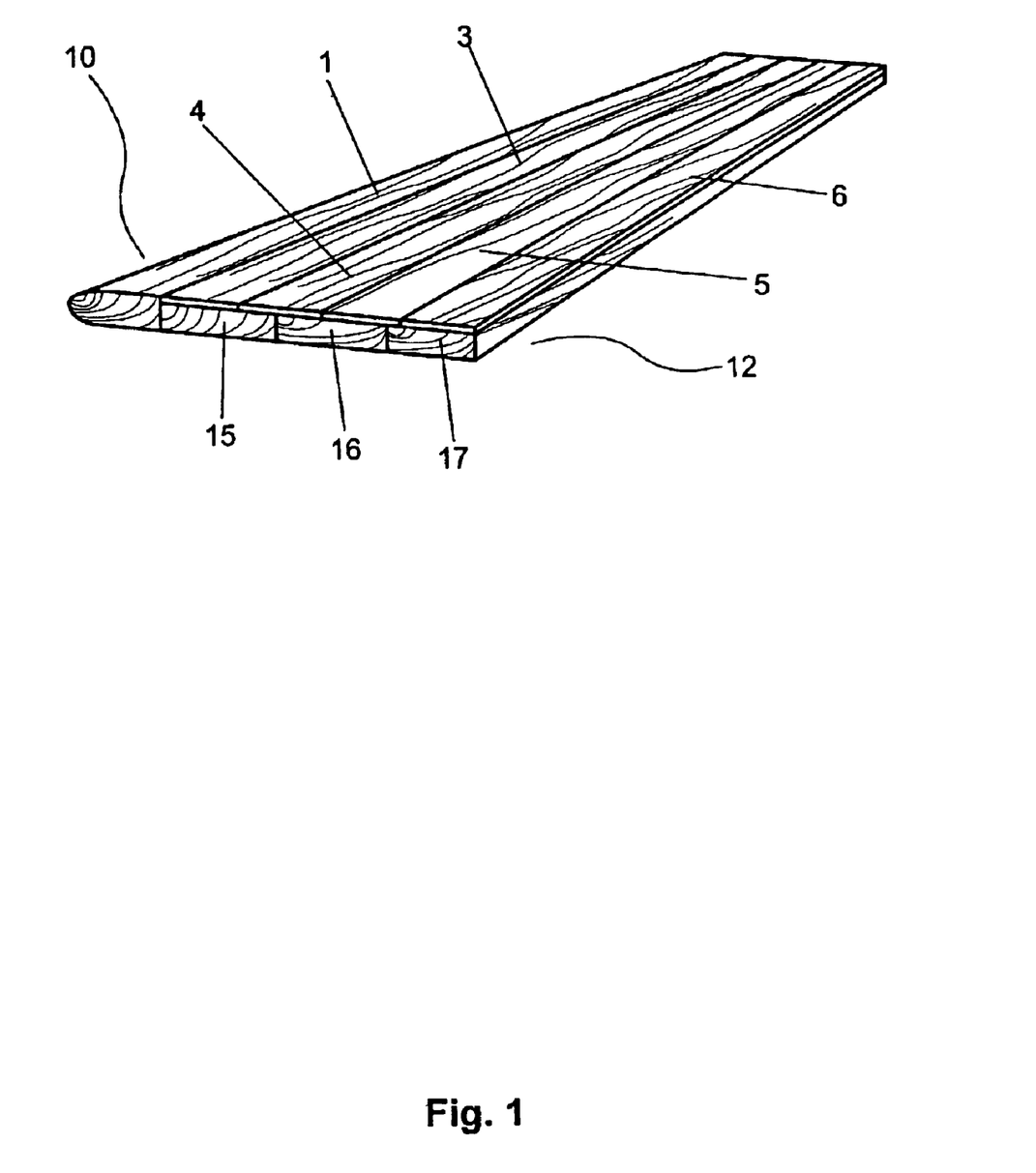
FIG. 1 is a perspective top view of a stair tread according to the invention.

FIG. 1 illustrates a top perspective view of an embodiment of the invention. The nose 1 is rounded in cross-section from top to bottom and laterally affixed at the front of the tread 10. In the embodiment depicted, the cover strip includes a plurality of four portions 3, 4, 5, 6 that extend the length of the tread 10. The base portion 12 shown here includes a plurality of three strips 15, 16, 17 of approximately equal width, each of which extends the length of the tread. In one embodiment, any of the strips in the base can include finger joints (not shown).

Figure 2:
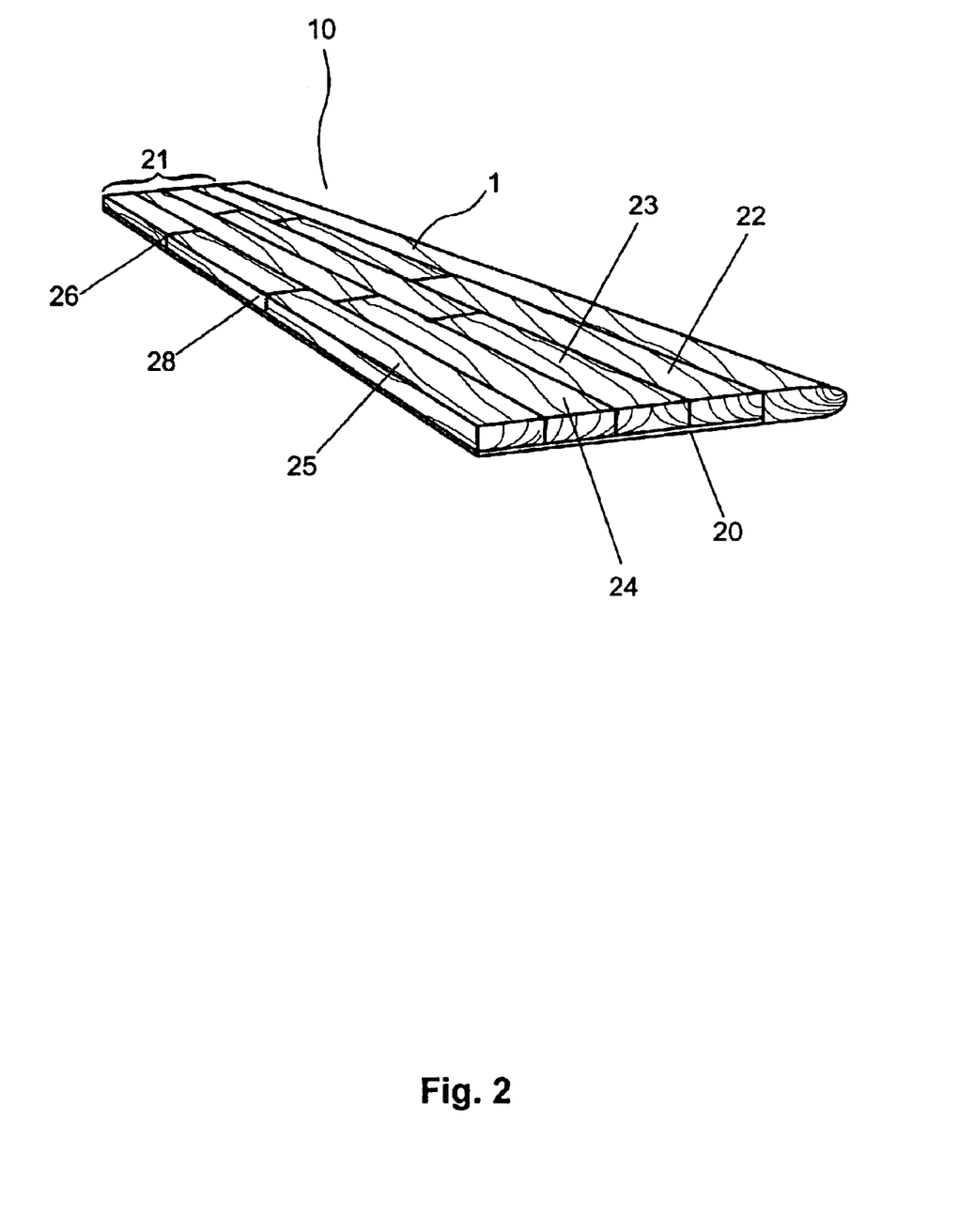
FIG. 2 is a perspective bottom view of a stair tread according to the invention.

FIG. 2 illustrates a bottom perspective view of an embodiment of the invention. The nose 1 of the tread 10 is again at the front and is laterally affixed to the remainder of the tread, i.e., the cover strip 20 and the central base portion 21. The optional central base portion is present in this embodiment, and includes three strips 22, 23, 24. The rear base strip 25 is laterally affixed to the central base portion. The cover strip 20 illustrated is a single, unbroken piece, but if desired it can be split into various portions that may be oriented along the length or perpendicularly thereto as desired (not shown). When multiple cover strip portions are included, the joints between the cover portions and the central base strips 22, 23, 24 can line up or in one embodiment can preferably be staggered to provide additional strength (not shown). The strips 22, 23, 24 of the central base portion 21 are shown here in pieces that are laid end-to-end to form strips the full length of the tread. If desired, they can be affixed, such as with an adhesive component. The rear base strip 25 is formed of three pieces that are laid end-to-end. The adjacent pieces have finger joints 26, 28 according to the invention, which are preferably permanently joined with an adhesive component.

Figure 3:
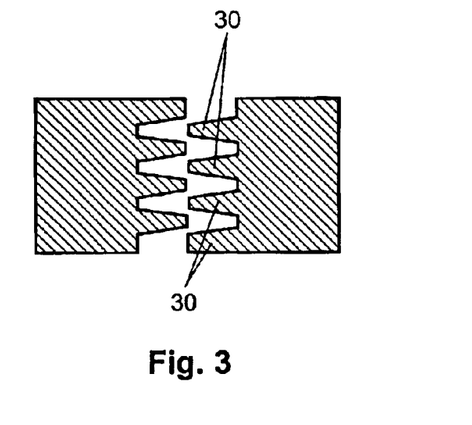
FIG. 3 is a side view of trapezoidally shaped finger joints according to the invention.
Figure 4:
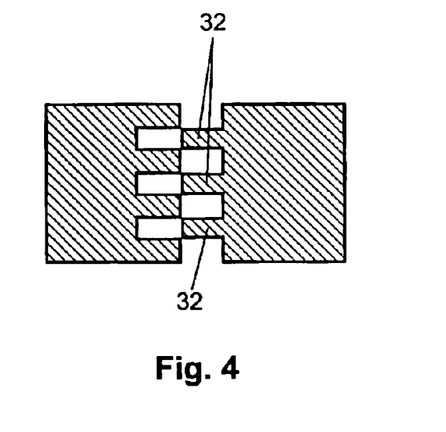
FIG. 4 is a side view of square or rectangular shaped finger joints according to the invention.
Figure 5:
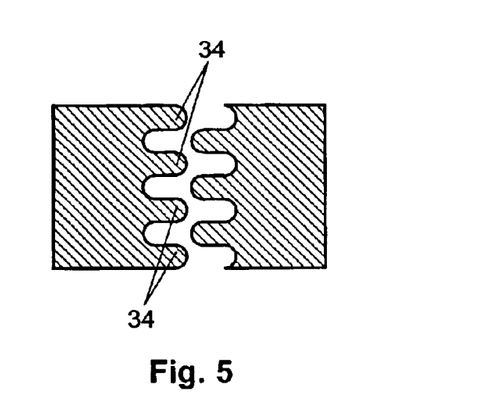
FIG. 5 is a side view of a first type of jigsaw puzzle shaped finger joints according to the invention.
Figure 6:
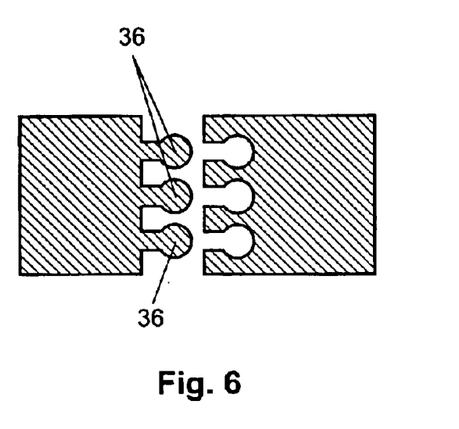
FIG. 6 is a side view of a second type of jigsaw puzzle shaped finger joints according to the invention.
Figure 7:
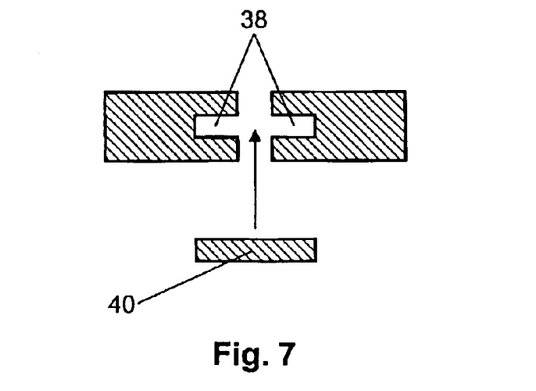
FIG. 7 is a side view of a hole and insert type finger joint according to the invention.
Figure 8:
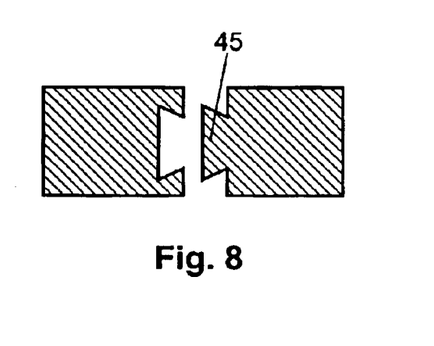
FIG. 8 is a side view of a dovetail finger joint according to the invention.
Figure 9:
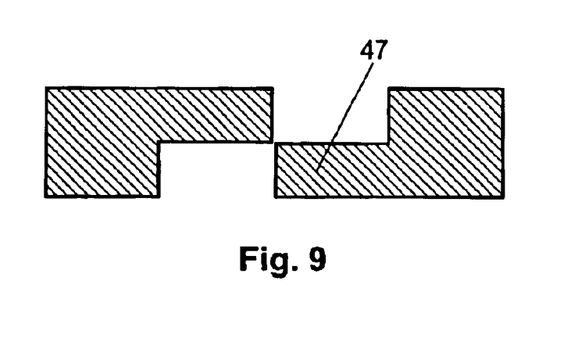
FIG. 9 is a side view of a ship lap finger joint according to the invention.
Figure 10:
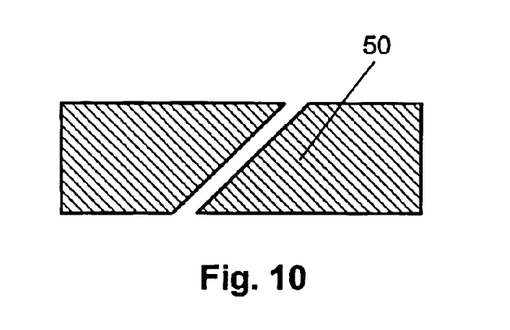
FIG. 10 is a side view of a scarf joint according to the invention.

Suitable finger joints are more readily seen in side view with reference to FIGS. 3–7. These joints and others can be used for the rear base strip, the nose strip, the central base portion, or any combination thereof. Preferably, finger joints are included only in the rear base strip, central base portion, or both. FIG. 3 depicts trapezoidally shaped finger joints 30, which are a preferred shape of finger joint according to the invention. FIG. 4 depicts a square/rectangular finger joint 32 arrangement. FIG. 5 depicts a jigsaw puzzle finger joint arrangement with rounded fingers 34. FIG. 6 depicts a second jigsaw puzzle finger joint with more traditional jigsaw puzzle fingers 36. This design requires pieces to be laterally assembled to fit the wider puzzle fingers into the gaps in the adjacent piece. A similar but simpler design would be to include a narrow triangle finger joint shape extending out on a post like the bulbs of FIG. 6, such that the triangle finger joint could snap into place on the opposing piece of material (not shown). FIG. 7 depicts a hole and insert finger joint arrangement, where the hole 38 is present in both adjacent pieces and the insert 40 is inserted into both holes 38 to provide strength against vertical loads on the stair tread. FIG. 8 depicts a dovetail finger joint 45 arrangement, wherein the pieces are slid laterally into position to form the end-to-end joint or even snapped into place depending on the angles chosen. Multiple dovetail finger joints 45 can be used in a single end-to-end finger joint, if desired (not shown). FIG. 9 depicts a ship lap finger joint 47. FIG. 10 depicts a scarf finger joint 50. Various other suitably strong shapes of finger joints may be envisioned, and although certain other finger shapes may necessarily be longer to attain suitable strength the length of such other shapes can be determined by those of ordinary skill in the art based on the teachings herein.

Figure 11:
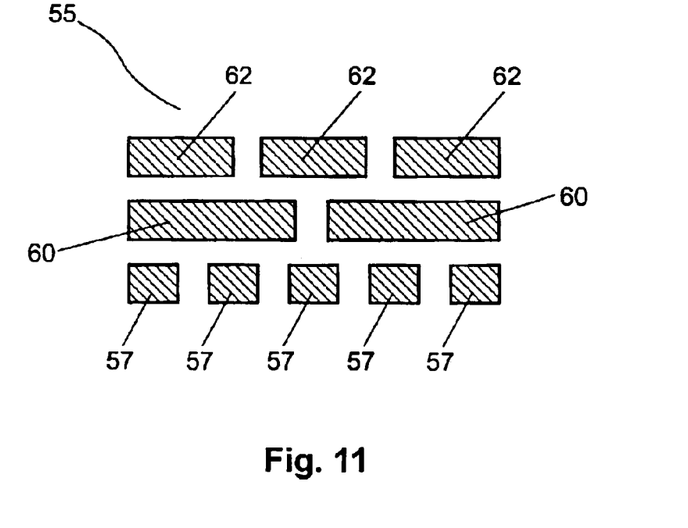
FIG. 11 is a side view of a brick-laying type pattern for forming a base strip according to the invention.

FIG. 11 depicts a side view of a brick-layered type pattern that can be used to form a strip 55 of the base or rear base of the invention. These pieces are combined to form the strip 55 that extends the length of the tread. The bottom-most portion depicted includes 5 small pieces 57, the next layer disposed thereon includes 2 pieces 60, and the top-most portion includes 3 pieces 62. These pieces preferably include an adhesive component between the end-to-end joints between the pieces of a given layer, e.g., small pieces 57; in face adhered fashion between the layers, e.g., between one or more small pieces 57 and pieces 60 in the middle layer; or a combination of end-to-end adhesive component and face-adhesive component. Although not shown, after the pieces of the strip 55 are suitably combined with each other, the strip 55 is joined to any adjacent strips or the nose, and the cover strip is then applied thereover the strip 55, preferably with adhesive component therebetween. In another embodiment, the strip 55 of FIG. 11 can be oriented front to rear in the tread.

Figure 12:
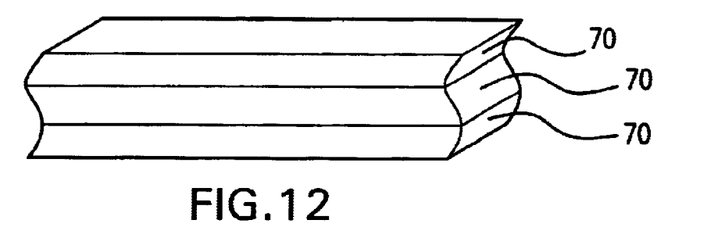
FIG. 12 is a perspective view of a nose strip having a plurality of portions according to the invention.

FIG. 12 shows a perspective view of a nose strip having a plurality of portions 70 according to the invention. In the depicted embodiment, the portions 70 are oriented horizontally and stacked vertically to form the nose strip.

Figure 13:
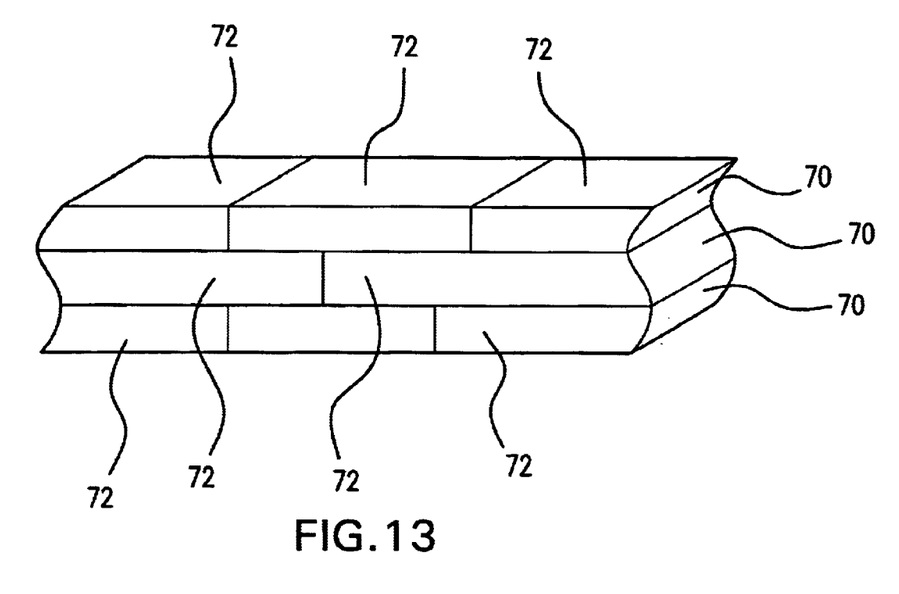
FIG. 13 is a perspective view of a nose strip having a plurality of end to end pieces according to the invention.

FIG. 13 shows a perspective view of a nose strip of the invention having a plurality of end to end pieces 72 that make up the plurality of portions 70. A single portion 70 can be formed of end to end pieces while the other portions 70 are single pieces that extend the full length of the nose strip (not shown).

Figure 14:
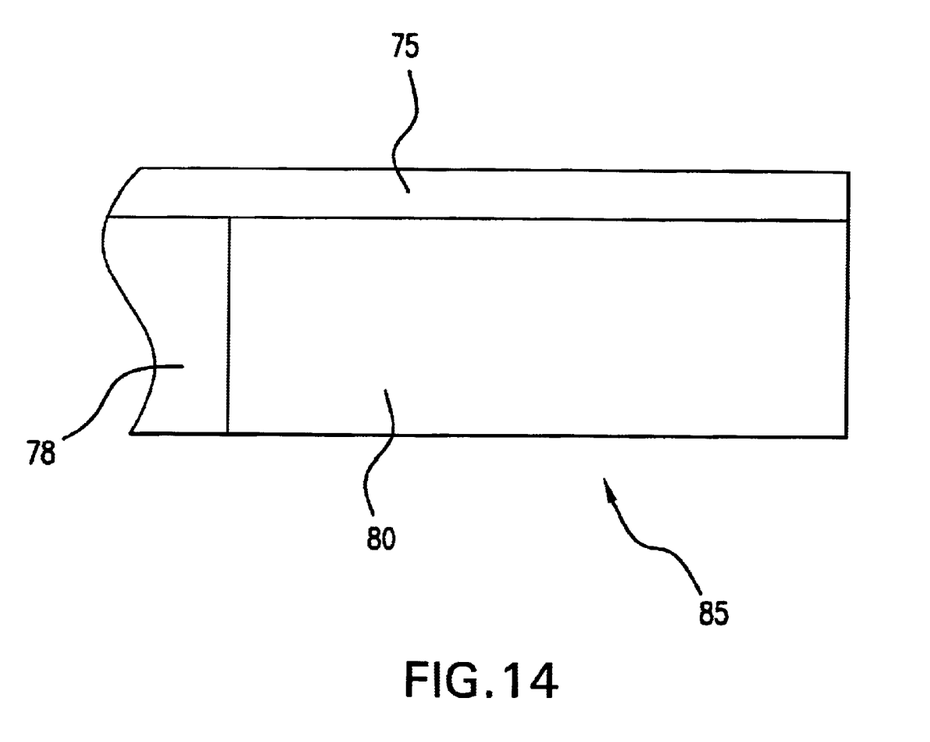
FIG. 14 illustrates a side view of a cover strip extending over the nose strip according to the invention.

FIG. 14 depicts a cover strip 75 extending over a nose strip 78 to form a portion thereof. The base 80 of the stair tread 85 is under the cover strip 75 and behind the nose strip 78.

EXAMPLES

The following examples are not intended to limit the scope of the invention, but merely to illustrate representative possibilities concerning the present invention.

Example 1

A Finger-Jointed Stair Tread According to the Invention

A stair tread according to the invention was made using an high grade red oak nose and red oak cover strip of 2 cover strip portions edge glued laterally together. The central base portion included 3 strips of lower grade red oak wood, each strip being formed of 3 pieces of unequal length. The rear strip was formed of 4 pieces joined end-to-end with wood glue from Borden Chemical using five finger joints between adjacent pieces. Three of the pieces were of equal length and one piece was approximately one-fourth the size of the other pieces to complete a rear strip having the length of the tread. The rear base strip and the strips of the central base portion were all edge glued using wood glue, the cover strip was face glued to the rear base strip and the central base portion, and the nose of an height equal to the central base portion and the cover strip thereon was edge glued laterally thereto. The nose was rounded in cross-section using conventional molding techniques. This stair tread surprisingly and unexpectedly provided improved strength with an appearance that matches those of solid hardwood stair treads.

Example 2

Finger-Jointed Stair Tread According to the Invention

The stair tread of Example 1 can be made, for example, using cherry for the cover strip, the nose strip, or both, with lower grades of red oak being used for the central base portion and rear base strip.

Example 3

Finger-Jointed Stair Tread According to the Invention

The stair tread of Example 1 can be made, for example, modified by using poplar wood to form the central base portion, the rear base strip, or both, with a red oak nose strip and cover strip.

Example 4

Finger-Jointed Stair Tread According to the Invention

The stair tread of Example 1 can be made, for example, using MDF for the central base portion, a low grade hardwood such as low grade red oak for the rear base strip, and high grade cherry or high grade red oak for the cover strip, the nose strip, or both.

The term "substantially," as used herein to define planar or parallel, is intended to include variations from true planarity or parallelism that do not affect the overall appearance or function of the stair tread. Generally, such variations will be visually undetectable to a person during the ordinary course of use of the stair tread.

The term "about," as used herein, should generally be understood to refer to both numbers in a range of numerals. Moreover, all numerical ranges herein should be understood to include each whole integer within the range.

As used herein, the term "affixed" includes any method, structure, or composition to permanently join two pieces of material, preferably by use of one or more adhesive components, nails, screws, or other suitable fastening device, or a combination thereof. In one embodiment, affixing refers to the use of an adhesive component or adhering. Use of an adhesive component or adhering is preferred over more visible types of fasteners like nails or screws particularly in portions of the stair tread that will be visible, i.e., the nose strip or the cover strip.

As used herein, "hardwood" refers to oak (including red oak), maple, cherry, walnut, ash, or the like, or any combination thereof, preferably high grades of such hardwoods. "Wood" includes hardwoods, including low grade hardwoods, and all other woods, but preferably refers to non-hardwoods.

As used herein, "planing" or "planed" refers to any method available to those of ordinary skill in the art to make a surface planar or at least substantially planar to provide a smooth fit with a corresponding surface. Planing can be accomplished, for example, by ripping (including straight line ripping), reripping, edge ripping, molding, or the like.

Although preferred embodiments of the invention have been described in the foregoing description, it will be understood that the invention is not limited to the specific embodiments disclosed herein but is capable of numerous modifications by one of ordinary skill in the art. It will be understood that the materials used and the mechanical details may be slightly different or modified from the descriptions herein without departing from the methods and compositions disclosed and taught by the present invention.

What is claimed is:

1. A stair tread having a predetermined length, a front, a rear, a top and a bottom, wherein the top and the bottom are at least substantially planar and substantially parallel to each other, comprising:

a nose portion extending the length of the stair tread, having a hardwood appearance at the top, and having an edge at the front that is shaped in cross-section from the top to the bottom to provide the nose to the stair tread;

a base comprising a plurality of base strips having a first joint between each adjacent base strip, wherein the base extends the length of the tread and, together with the nose portion, extends from the front to the rear of the tread and wherein one of the base strips is a rearmost base strip disposed adjacent the rear of the stair tread, wherein at least the rearmost base strip comprises a plurality of adjacent base pieces that are permanently attached end-to-end in a direction alone the length of the tread using 3 to 15 finger joints and an adhesive component; and a separately formed cover strip disposed over the base and sized sufficiently to provide the appearance of hardwood on the top.

2. The tread of claim 1, wherein the nose portion comprises a plurality of portions that extend the length of the tread and are permanently joined by an adhesive component.

3. The tread of claim 2, wherein the plurality of portions comprises at least three portions oriented horizontally and stacked vertically over each other to extend from the top to the bottom of the tread.

4. The tread of claim 3, wherein at least one of the portions comprises a plurality of pieces arranged end-to-end.

5. The tread of claim 1, wherein the cover strip comprises a plurality of laterally adhered portions having a second joint between each adjacent portion.

6. The tread of claim 5, wherein the first and second joints are staggered or perpendicular to each other so as not to line up.

7. The tread of claim 1, wherein at least one of the base strips comprises a plurality of portions that are oriented horizontally and adhered to each other in a stacked, vertical arrangement.

8. The tread of claim 1, wherein the separately formed cover strip extends over the nose portion.

9. A stair tread having a predetermined length, a front, a rear, a top and a bottom, wherein the top and the bottom are at least substantially planar and substantially parallel to each other, comprising:
a nose portion extending the length of the stair tread, having a hardwood appearance at the top, and having an edge at the front that is shaped in cross-section from the top to the bottom to provide the nose to the stair tread;
a base comprising a plurality of base strips having a first joint between each adjacent base strip, wherein the base extends the length of the tread and, together with the nose portion, extends from the front to the rear of the tread; and
a separately formed cover strip comprising a plurality of laterally adhered portions that are transversely disposed in a direction from front to rear over the base and sized sufficiently to provide the appearance of hardwood on the top.

10. A stair tread having a predetermined length, a front, a rear, a top and a bottom, wherein the top and the bottom are at least substantially planar and substantially parallel to each other, comprising:
a nose portion extending the length of the stair tread, having a hardwood appearance at the top, and having an edge at the front that is shaped in cross-section from the top to the bottom to provide the nose to the stair tread;
a rearmost base strip at the rear of the stair tread and comprising a plurality of rear pieces, wherein an adhesive component is disposed over a sufficient surface area between each pair of adjacent rear pieces so as to permanently attach each pair of adjacent rear pieces end-to-end in a direction along the length of the tread; and
a cover strip that covers the rearmost base strip sufficiently to provide the appearance of hardwood on the top.

11. The stair tread of claim 10, wherein the sufficient surface area is provided by 3 to 15 finger joints between each pair of adjacent rear pieces.

12. The stair tread of claim 10, wherein the nose portion is made of a single, unbroken hardwood member that extends from the top to the bottom of the stair tread.

13. The stair tread of claim 10, further comprising a central base portion between the rearmost base strip and the nose portion that extends the length of the tread, wherein the cover strip fully extends over the length of the tread and also covers the central base portion.

14. The stair tread of claim 11, wherein about 4 to 6 finger joints are present between adjacent rear pieces.

15. The stair tread of claim 11, wherein the finger joints are trapezoidally shaped.

16. The stair tread of claim 11, wherein at least two of the finger joints between a pair of rear pieces are about $1/8$ to $5/8$ inches long.

17. The stair tread of claim 13, wherein the central base portion comprises multiple central base strips extending the length of the tread.

18. The stair tread of claim 13, wherein the cover strip comprises a plurality of cover strip portions that each extend the length of the tread and have a first joint therebetween, the central base portion is attached laterally to the rearmost base strip to form a second joint, and the first and second joints are disposed so as not to lie adjacent to each other.

19. The stair tread of claim 17, wherein each central base strip has a separate cover strip portion of the cover strip disposed thereon.

20. The stair tread of claim 13, wherein the cover strip comprises a plurality of cover strip portions that extend the length of the tread and comprise hardwood.

21. The stair tread of claim 10, wherein the adhesive component comprises at least one glue, hot melt, or a combination thereof.

22. The stair tread of claim 10, wherein the nose portion and cover strip comprise the same hardwood.

23. The stair tread of claim 10, wherein the rearmost strip comprises 2 to 12 rear pieces.

24. The stair tread of claim 11, wherein the finger joints are disposed vertically relative to each other.

25. The tread of claim 11, wherein the finger joints are disposed horizontally relative to each other.

26. A method of forming a stair tread having a predetermined length, which comprises:
providing a plurality of first pieces having ends with sufficient surface area therebetween to facilitate permanent bonding of the first pieces;
permanently joining the adjacent first pieces end-to-end with an adhesive component to form a rearmost portion extending the length of the stair tread;
attaching a cover portion over a sufficient amount of the rearmost portion to provide a visible appearance of hardwood to the stair tread; and
laterally attaching a nose portion comprising hardwood to the combined rearmost portion and cover portion so as to form a stair tread having the appearance of hardwood.

27. The method of claim 26, wherein the stair tread is formed by including a central base portion between the rearmost portion and the nose portion before covering both the rearmost and central portions with the cover portion, wherein the central base portion is formed by attaching one or more second pieces in one or more strips that extend the length of the tread.

28. The method of claim 26, wherein the cover portion comprises one or more pieces of hardwood veneer fully extending over the length of the stair tread.

29. A method of forming a stair tread having a predetermined length, which comprises:
providing a plurality of first pieces having ends with sufficient surface area therebetween to facilitate permanent bonding of the first pieces;
permanently joining the adjacent first pieces end-to-end with an adhesive component to form a rearmost portion extending the length of the stair tread;

attaching a cover portion over a sufficient amount of the rearmost portion to provide a visible appearance of hardwood to the stair tread; and laterally attaching a nose portion comprising hardwood to the combined rearmost portion and cover portion so as to form a stair tread having the appearance of hardwood;

wherein the stair tread is formed by including a central base portion between the rearmost portion and the nose portion before covering both the rearmost and central portions with the cover portion, the central base portion being formed by attaching one or more second pieces in one or more strips that extend the length of the tread, and wherein the attaching of the rearmost portion and the central base portion includes planing abutting edges of the rearmost and central base portions to make them at least substantially planar, and then laterally adhering the substantially planar edges together with an adhesive component before attaching the cover portion, wherein the cover portion is configured and dimensioned to fully cover both the rearmost and central portions.

30. The method of claim 29, wherein the attaching of the cover portion comprises adhering adjacent hardwood veneer pieces extending the length of the tread to form the cover portion, and then permanently adhering the cover portion to the rearmost and central base portions.

31. The method of claim 30, wherein laterally attaching the nose portion comprises planing abutting edges of the central base portion and the nose portion into substantially planar surfaces and then adhering the substantially planar surfaces together.

32. The method of claim 31, wherein the nose portion is shaped to form a desired shape on the visible portion of the stair tread.

* * * * *

UNITED STATES PATENT AND TRADEMARK OFFICE
CERTIFICATE OF CORRECTION

PATENT NO. : 6,860,071 B2
DATED : March 1, 2005
INVENTOR(S) : Weaber et al.

It is certified that error appears in the above-identified patent and that said Letters Patent is hereby corrected as shown below:

Title page,
Item [63], delete "Related U.S. Application Data, [63] Continuation of application No. 08/364,251, filed on Dec. 27, 2994, now abandoned."

Column 14,
Line 59, after "attached end-to-end in a direction", delete "alone" and insert -- along --.

Signed and Sealed this

Twenty-fourth Day of May, 2005

JON W. DUDAS
*Director of the United States Patent and Trademark Office*